US007127702B2

United States Patent
Seki

(10) Patent No.: US 7,127,702 B2
(45) Date of Patent: Oct. 24, 2006

(54) APPLICATION DEVELOPMENT SYSTEM AND METHOD

(75) Inventor: Takeo Seki, Oume (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 319 days.

(21) Appl. No.: 09/983,932

(22) Filed: Oct. 26, 2001

(65) Prior Publication Data

US 2002/0053070 A1 May 2, 2002

(30) Foreign Application Priority Data

Oct. 27, 2000 (JP) ............................. 2000-328819

(51) Int. Cl.
*G06F 9/44* (2006.01)
*G06F 15/00* (2006.01)
(52) U.S. Cl. ...................... 717/107; 717/120; 715/513
(58) Field of Classification Search ........ 717/100–104, 717/107, 108, 116, 109, 120, 174, 175, 123; 715/513
See application file for complete search history.

(56) References Cited

U.S. PATENT DOCUMENTS

| 6,199,195 B1 * | 3/2001 | Goodwin et al. ........... 717/104 |
| 6,275,977 B1 * | 8/2001 | Nagai et al. ................ 717/104 |
| 6,301,708 B1 * | 10/2001 | Gazdik et al. .............. 717/175 |
| 6,467,080 B1 * | 10/2002 | Devine et al. .............. 717/123 |
| 6,557,164 B1 * | 4/2003 | Faustini ..................... 717/107 |
| 6,601,233 B1 * | 7/2003 | Underwood ................ 717/102 |
| 6,681,391 B1 * | 1/2004 | Marino et al. .............. 717/175 |
| 6,701,513 B1 * | 3/2004 | Bailey ........................ 717/109 |
| 6,718,533 B1 * | 4/2004 | Schneider et al. .......... 717/100 |
| 6,735,768 B1 * | 5/2004 | Tanaka ....................... 717/174 |

* cited by examiner

*Primary Examiner*—Antony Nguyen-Ba
(74) *Attorney, Agent, or Firm*—Oblon, Spivak, McClelland, Maier & Neustadt, P.C.

(57) ABSTRACT

There is provided an application development system capable of easily developing an application which is capable of flexibly coping with the variation in system environment, such as a platform, and which has excellent maintainability. In the application development system, a design tool 1 supports the designing of an application, which is based on the combination of a plurality of logical components, on the basis of a logical component information 4, to output a logical design information 5 obtained by the designing of the application. A source generating part 2 and a compiler 3 produce an application (an executable file 9), which is executable on a specific platform, on the basis of the logical design information 5, which is outputted from the design tool 1, and a physical installation information (a physical component information 6 and a component library 8) for software components.

11 Claims, 19 Drawing Sheets

```
<framework name="fw1">
        <component type="A"/>   ···Ⓐ
        <component type="B"/>   ···Ⓐ
        <component type="C"/>   ···Ⓐ
        <connection from="A" to="B"/>    ⎫
        <connection from="A" to="C"/>    ⎬ Ⓑ
</framework>                              ⎭
```

FIG. 7A

```
<componenttype name="A">
        <property name="name"type="string" />      ⎫ Ⓒ
        <property name="option"type="string" />    ⎭
        <terminal id="out" type="out" min=1 max=3>  ⎫
                <connectwith type="B"/>             ⎬ Ⓓ
                <connectwith type="C"/>             ⎭
        </terminal>
</componenttype>
<componenttype name="B">
        <property name="name"type="string" />
        <property name="option"type="string" />
        <terminal id="in" type="in" min=1 max=1>
                <connectwith type="A"/>
        </terminal>
</componenttype>
<componenttype name="C">
        <property name="name"type="string" />
        <property name="option"type="string" />
        <terminal id="in" type="in" min=1 max=1>
                <connectwith type="A"/>
        </terminal>
</componenttype>
```

FIG. 7B

```
<component type="A",name="parent" option=1>
</component>
<component type="B",name="child1" option=11>
</component>
<component type="C",name="child2" option=12>
</component>
<connection from="parent" to="child1" />
<connection from="parent" to="child2" />
```

```
<componentimpl name="A" impleclass="ClassX">
  <new code="ClassX%name%=ClassX.newinstance()"/>      ------(G)
  <property name="option" code="%name%.addItem("OPTION","%value%","string")"/>  ----(H)
</componentimpl>
<componentimpl name="B" impleclass="ClassY">
  <new code="ClassY%name%=ClassY.newinstance()"/>
  <property name="option" code="%name%.addItem("OPTION","%value%","string")"/>
</componentimpl>
<componentimpl name="C" impleclass="ClassZ">
  <new code="ClassZ%name%=ClassZ.newinstance()"/>
  <property name="option" code="%name%.addItem("OPTION","%value%","string")"/>
</componentimpl>
<connectionimple>
  <code="%from%.addItem("CHILD",%to%);"/>       }----(I)
  <code="%to%.addItem("PARENT",%from%);"/>
</componenttype>
```

FIG. 9

```
<frameworkimpl name="fw1" >
        <init file="fw1init.java" />  -------- Ⓙ
        <term file="fw1term.java" />  ------ Ⓚ
</componenttype>
```

FIG. 10A fw1 init.java
```
import java. lang. *;
import java. util. *;

•
    •(VARIOUS DEFINITION ITEMS)
    • public class AA1 implements AA
{
        public Object bbbb()
        {
                •
                •(VARIOUS INITIALIZATION PROCESSINGS)
                •
```

FIG. 10B fw1 term.java
```
                •
                •(VARIOUS END PROCESSINGS)
                •
        }
}
```

FIG. 10C

```
import java.lang.*;
import java.util.*;
    .
    · (VARIOUS DEFINITION ITEMS)
    .

public class AA1 implements AA
{
        public Object bbbb()
        {
            .
            · (VARIOUS INITIALIZATION PROCESSINGS)
            .
            ClassX parent=ClassX.newinstance();
            parent.addItem("OPTION","1","string)";
            ClassY child1=ClassY.newinstance();
            child1.addItem("OPTION","11","string)";
            ClassZ parent=ClassZ.newinstance();
            parent.addItem("OPTION","12","string)";
            parent.addItem("CHILD",child1);
            child1.addItem("PARENT",parent);
            parent.addItem("CHILD",child2);
            child2.addItem("PARENT",parent);
            .
            · (VARIOUS END PROCESSINGS)
            .
        }
}
```

FIG. 11

```
<componentimpl name="A" impleclass="ClassX">
    <property name="option" type=string"/>
</componenttype>
<componentimpl name="B" impleclass="classY">
    <property name="option" type=string"/>
</componenttype>
<componentimpl name="C" impleclass="classZ">
    <property name="option" type=string"/>
</componenttype>
```

FIG.15

```
<frameworkimpl name="fw1">
        <init file="fw1init.java"/> ------- Ⓛ
        <main file="fw1main.java"/>---- Ⓜ
        <term file="fw1term.java"/>------ Ⓝ
</componenttype>
```

FIG.16A fw1 init.java

```
import java. lang. *;
import java. util. *;
     •
     • (VARIOUS DEFINITION ITEMS)
     • public class AA1 implements AA
{
        public Object bbbb()
        {
          •
          • (VARIOUS INITIALIZATION PROCESSINGS)
          •
```

FIG.16B fw1main.java

```
     •
     •
     •
     • (INTERPRETER-TYPE COMPONENT OBJECT GENERATING PROCESSINGS)
     •
     •
     •
```

FIG.16C fw1term.java

```
     •
     • (VARIOUS END PROCESSINGS)
     •
        }
}
```

FIG.16D

```
import java. lang. *;
import java. util. *;
    ·
    ·(VARIOUS DEFINITION ITEMS)
    · public class AA1 implements AA
{
        public Object bbbb()
        {
            ·
            ·(VARIOUS INITIALIZATION PROCESSINGS)
            ·
            ·
            ·
            · (INTERPRETER-TYPE COMPONENT OBJECT GENERATING PROCESSINGS)
            ·
            ·
            ·
            ·
            ·
            · (VARIOUS END PROCESSINGS)
            ·
        }
}
```

FIG.17

APPLICATION DEVELOPMENT SYSTEM AND METHOD

BACKGROUND OF THE INVENTION

1. Field of the Invention

The present invention relates generally to an application development system for combining a plurality of software components to develop an application.

2. Description of the Related Art

Conventionally, an application development system for combining a plurality of software components to develop an application has been known. As shown in FIG. 19, in such a conventional application development system, an application 40 is developed by combining physical components 42 (see reference number 43), which are software components installed for a specific platform 41, at a physical level.

However, since the combination of the software components is described at the physical level in the above described conventional application development system, the description depending on the platform (system environment such as OS, middleware, language and communication), on which the software components are installed, is required, so that there is a problem in that it is difficult to transfer the developed application 40 to another platform.

In addition, in the above described conventional application development system, the description of the original processing (e.g., business processing) of the application 40 and the description of the inherent processing of the platform are mixed in the application 40 to be developed, so that there is a problem in that the maintainability of the application 40 is bad.

SUMMARY OF THE INVENTION

It is therefore an object of the present invention to eliminate the aforementioned problems and to provide an application development system and method, a computer-readable recording medium having stored an application development program, and an application generating method, which are capable of easily developing an application which is capable of flexibly coping with the variation in system environment, such as a platform, and which has excellent maintainability.

FIG. 20 is a schematic diagram for explaining an application development method according to the present invention. As shown in FIG. 20, according to the present invention, logical components 52 provided by extracting a portion, which does not depend on a platform 41, are provided so as to correspond to a plurality of software components, respectively. These logical components 52 are combined to design an application (see reference number 53). Then, an application 40, which is executable on the specific platform 41, is generated on the basis to of a logical design information, which is obtained by such a designing, and a physical installation information (a physical component information including a correspondence between physical components 42 and the logical components 52, and a component library in which the installation information for the physical components 42 is included) for the software components.

Under such a basic principle, according to a first aspect of the present invention, there is provided an application development system for combining a plurality of software components to develop an application, the system comprising: a logical design part that supports the designing of an application, which is based on the combination of a plurality of logical components, on the basis of a logical component information including a definition information for the logical components, to output a logical design information obtained by the designing of the application, the logical components being provided so as to correspond to a plurality of software components, respectively, and the logical components being provided by extracting a portion, which does not depend on a system environment, from the software components; and a physical installation part that generates an application, which is executable on the system environment, on the basis of the logical design information, which is outputted from the logical design part, and a physical installation information for the software components.

In the above described application development system, the logical design information is preferably described by the XML language.

Preferably, in the above described application development system, the logical design part and the physical installation part are provided on each of a client computer and a server computer which are connected to each other via a network, and the logical design information is delivered between the client computer and the server computer.

According to a second aspect of the present invention, there is provided an application development method for combining a plurality of software components to develop an application, the method comprising the steps of: supporting the designing of an application, which is based on the combination of a plurality of logical components, on the basis of a logical component information including a definition information for the logical components, the logical components being provided so as to correspond to a plurality of software components, respectively, and the logical components being provided by extracting a portion, which does not depend on a system environment, from the software components; and generating an application, which is executable on the system environment, on the basis of the logical design information, which is obtained by the designing, and a physical installation information for the software components.

According to a third aspect of the present invention, there is provided a computer-readable recording medium having stored an application development program for combining a plurality of software components to develop an application, the program for causing a computer to execute the procedures of: supporting the designing of an application, which is based on the combination of a plurality of logical components, on the basis of a logical component information including a definition information for the logical components, the logical components being provided so as to correspond to a plurality of software components, respectively, and the logical components being provided by extracting a portion, which does not depend on a system environment, from the software components; and outputting a logical design information which is obtained by the designing.

According to a fourth aspect of the present invention, there is provided a computer-readable recording medium having stored an application development program for combining a plurality of software components to develop an applications the program for causing a computer to execute the procedures of: reading a logical design information obtained by combining logical components which are provided so as to correspond to a plurality of software components, respectively, and which are provided by extracting a portion, which does not depend on a system environment, from the software components; and generating an application, which is executable on the system environment, on the basis of the logical design information read by the above step and a physical installation information for the software components.

According to a fifth aspect of the present invention, there is provided an application generating method for combining a plurality of software components to generate an application, the method comprising the steps of: presenting a specific information for logical components, which are provided so as to correspond to a plurality of software components, to make a user select one of the logical components; generating a logical design information on the basis of a logical component information with respect to the logical component selected by the user, the logical component information including a definition information for the selected logical component, and generating an application on the basis of the logical design information and a physical installation information for the software components.

According to the present invention, the development of an application, which is based on the combination of software components, is divided into (1) the processing (logical layer) for designing an application by combining logical components provided by extracting portions, which do not depend on a system environment, such as a platform, from the software components, and (2) the processing (physical layer) for generating an application by combining physical components, which are software components depending on the system environment, on the basis of a logical design information obtained by the designing of the application. Therefore, the respective portions of the logical layer can be commonly utilized regardless of the final system environment, so that it is possible to develop an application corresponding to the system environment by separately preparing the respective part of the physical layer in accordance with the system environment. Therefore, it is possible to easily develop an application which is capable of flexibly coping with the variation in system environment and which has excellent maintainability.

In addition, according to the present invention, the logical design information for connecting the processing in the logical layer to the processing in the physical layer is described by the XML language which is a general purpose language, so that, flexibility can be given to both of the physical layer and the logical layer. Therefore, it is possible to easily replace the respective layers, and it is possible to extend the lifetime of the logical representation of the business processing of the application.

Moreover, according to the present invention, a logical layer (logical design part) and a physical layer (physical installation part) are provided on a client computer and a server computer, respectively, to deliver a logical design information between the client computer and the server computer, so that it is possible to suppress the traffic between the client computer and the server computer. Therefore, the application on the side of the server computer can be developed from the side of the client computer even in Internet environment, so that the present invention can be applied to a service which provides an open application development environment in Internet environment.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings:

FIGS. 7A and 7B show an example of a logical component information for use in the application development system shown in FIG. 1;

FIG. 9 shows an example of a physical component information (information related to a code generating method every software component) for use in the application development system shown in FIG. 1;

FIGS. 10A, 10B and 10C show an example of a physical component information (information related to the whole code generating method) for use in the application development system shown in FIG. 1;

FIG. 11 shows an example of source codes, which are generated by the application development system shown in FIG. 1;

FIG. 15 shows an example of a physical component information (information related to a code generating method every software component) for use in the application development system shown in FIG. 12;

FIGS. 16A, 16B, 16C and 16D show an example of a physical component information (information related to the whole code generating method) for use in the application development system shown in FIG. 12;

FIG. 17 shows an example of source codes, which are generated by the application development system shown in FIG. 12;

DESCRIPTION OF THE PREFERRED EMBODIMENTS

Referring now to the accompanying drawings, the preferred embodiment of the present invention will be described below. FIGS. 1 to 11 are drawings for explaining a preferred embodiment of an application development system according to the present invention. In this preferred embodiment, a case where an application development system is realized on a single computer will be described as an example.

Figure 1:
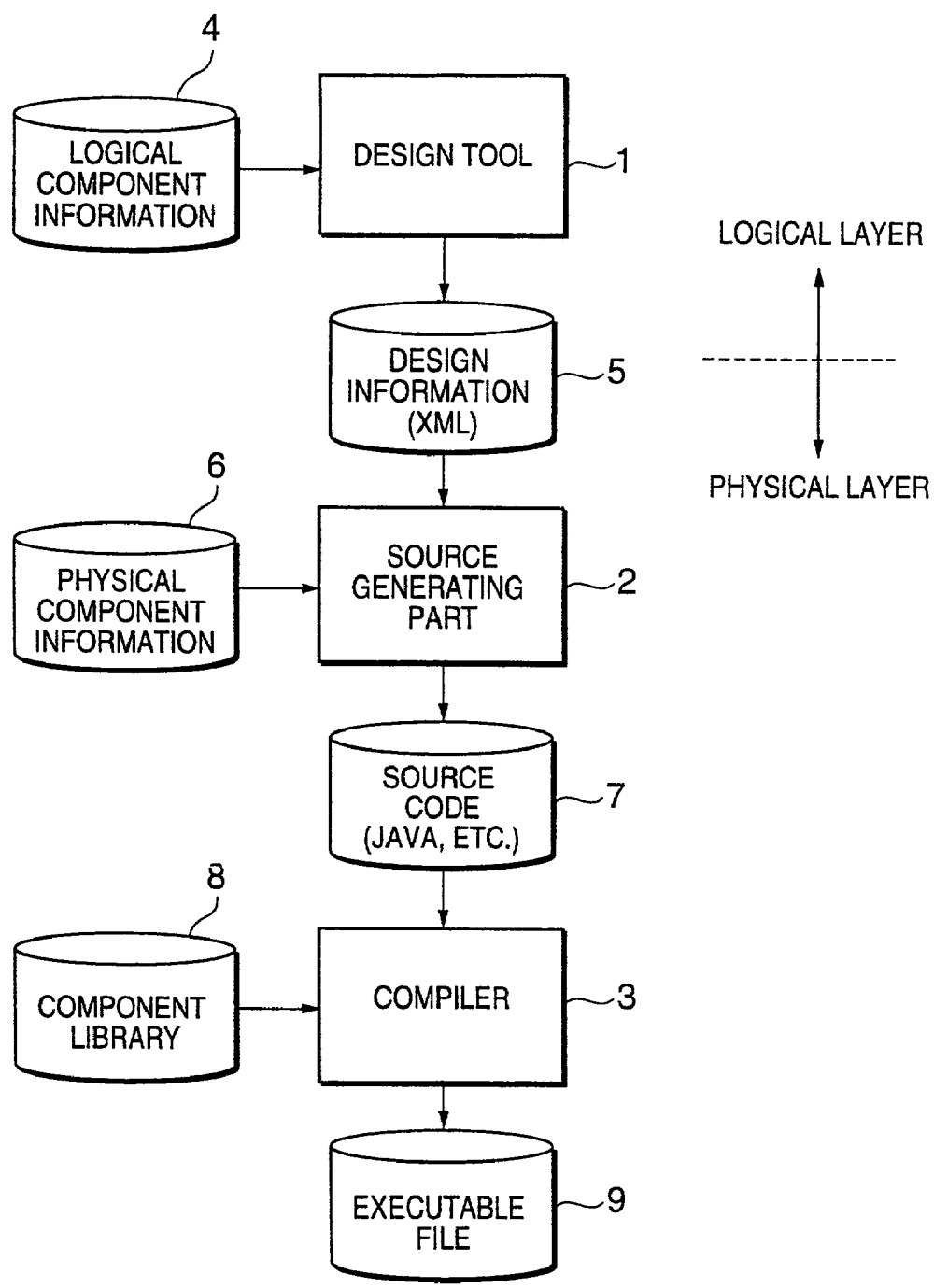
FIG. 1 is a block diagram of a system configuration showing a preferred embodiment of an application development system according to the present invention.

As shown in FIG. 1, an application development system in this preferred embodiment is designed to combine a plurality of software components to develop an application, and comprises a design tool (logical design part) 1, a source generating part 2, and a compiler (executable file generating part) 3. Furthermore, the source generating part 2 and the compiler 3 constitute a physical installation part.

Among these elements, the design tool 1 is designed to support the designing or an application, which is based on the combination of a plurality of logical components, on the basis of a logical component information 4, to output a logical design information 5 obtained by the designing of the application. The logical component information 4 to be inputted to the design tool 1 includes a definition information for the logical components, and is described as character string data by, e.g., the XML language (see FIGS. 7A and 7B). Furthermore, the logical components are components used for designing the application. The logical components are provided so as to correspond to a plurality of software components, respectively. The logical components are provided by extracting portions, which do not depend on a platform (system environment), from the software components. In addition, the logical design information 5 outputted from the design tool 1 includes an attribute information of each of the logical components and each connection information between logical components, and is described as character string data by, e.g., the XML language (see FIG. 8).

On the other hand, the source generating part 2 and the compiler 3 are designed to generate an application (executable file 9), which is executable on a specific platform, on the basis of the logical design information 5, which is outputted from the design tool 1, and a physical installation information (a physical component information 6 and a component library 8) of the software components.

Specifically, the source generating part 2 is designed to generate a source code 7 on the basis of the logical design information 5, which is outputted from the design tool 1, and the physical component information 6. It is noted that the physical component information 6 inputted to the source generating part 2 includes a correspondence between physical components and logical components which are installed for a specific platform, and is described as character string data by, e.g., the XML language (see FIGS. 9, 10A, 10B and 10C). Furthermore, the correspondence between the logical components and the physical components should not be limited to one to one, but it may be one to plural. For example, a physical component "a" may correspond to a logical component "A", or a physical component "a+b" may correspond to the logical component "A", so that a plurality of physical components can be defined with respect to the same logical component "A". More specifically, a physical component may be "UpdateWithCheck" with respect to a logical component "update with check", or a physical component may be "Check"+"Update" with respect to the logical component "update with check", so that a plurality of physical components can be defined with respect to the same logical component "update with check". In addition, the source code 7 outputted from the source generating part 2 is described as character string data by a programming language, such as JAVA (see FIG. 11).

In addition, the compiler 3 is designed to generate the executable file 9, which is executable on a specific platform, on the basis of the source code 7, which is generated by the source generating part 2, and the component library 8 in which the installation information of each of the physical components (interface, type definition, etc.) is stored. Furthermore, as the physical components stored in the component library 8, EJB, JAVABeans, JAVA class and so forth are used.

The design tool 1, the logical component information 4 and the logical design information 5 constitute a logical layer. The source generating part 2, the compiler 3, the physical component information 6, the source code 7, the component library 8 and the executable file 9 constitute a physical layer.

Figure 2:
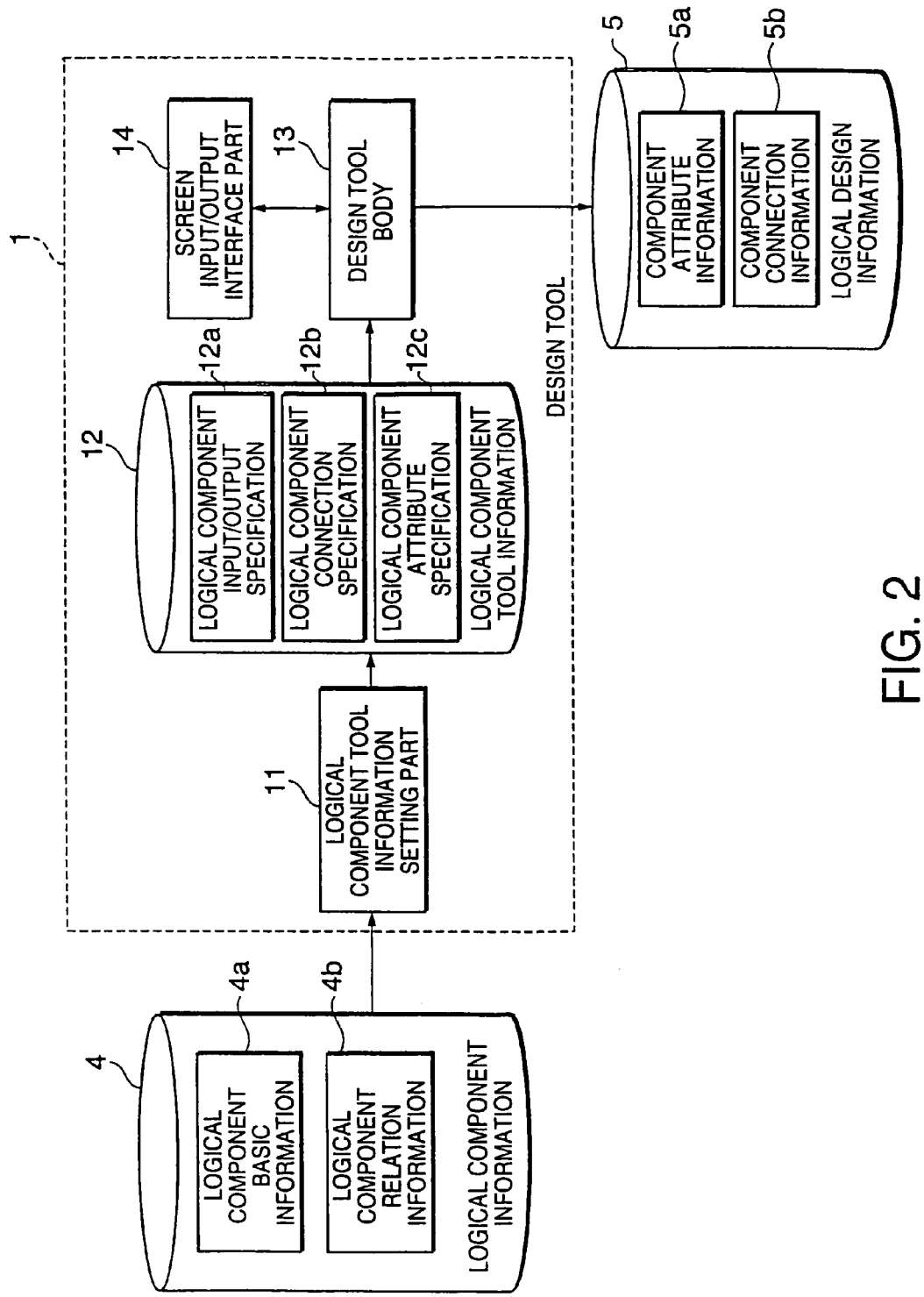
FIG. 2 is a block diagram showing the details of a design tool of the application development system shown in FIG. 1.

FIG. 2 is a diagram showing the details of the design tool 1 shown in FIG. 1.

As shown in FIG. 2, the design tool 1 includes a logical component tool information setting part (specification information generating part) 11 for generating a logical component tool information 12 on the basis of the logical component information 4, and a design tool body (design part body) 13 for supporting the designing of an application, which is based on the combination of the respective logical components, on the basis of the logical component tool information 12 generated by the logical component tool information setting part 11. Furthermore, the logical component information 4 includes a logical component basic information 4a (ID and attribute information of each logical component, input/output information, etc.) and a logical component relation information 4b (each connection information between logical components), as the definition information of logical components. In addition, the logical component tool information 12 indicates the specification information of each logical component, and includes an input/output specification of each logical component (a logical component input/output specification 12a), each connection specification between logical components (a logical component connection specification 12b), and an attribute specification of each logical component (a logical component attribute specification 12c). Furthermore, the logical design information 5 outputted from the design tool body 13 includes an attribute information of each logical component (a component attribute information 5a), and each connection information between logical components (a component connection information 5b).

In addition, the design tool 1 has a screen input/output interface part 14 which is connected to the design tool body 13. The screen input/output interface part 14 is designed to provide a graphical user interface (GUI) for expressing a plurality of logical components, which form the basis for designing, as icons on a tool screen, and can express combinations of software components constituting an application, which is to be developed, by a graphic structure which is obtained by drawing a relational line between icons. It is noted that the screen input/output interface part 14 can be realized as an interface program which operates on an application, such as Web browser.

Figure 3:
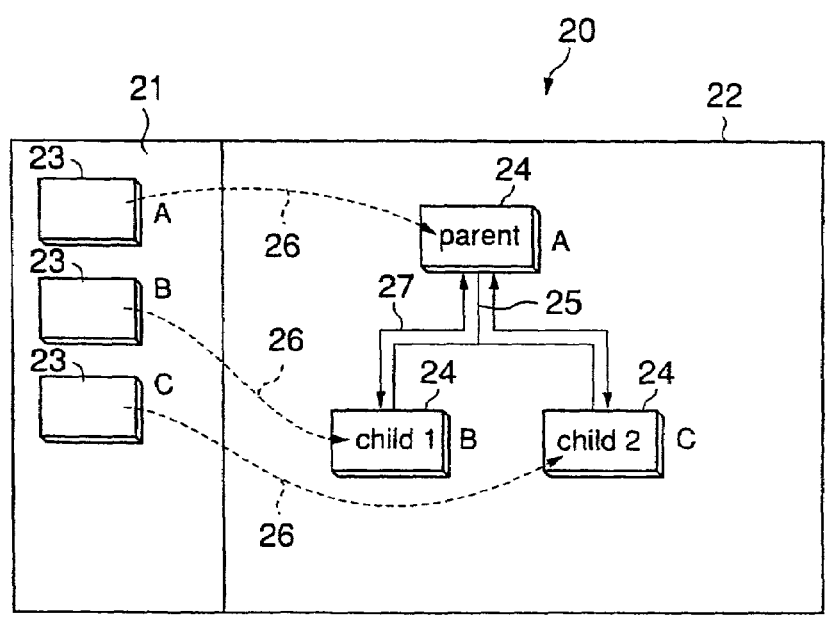
FIG. 3 is a diagram showing an example of a tool screen which is presented to a user in the application development system shown in FIG. 1.

FIG. 3 is a diagram showing an example of a tool screen. As shown in FIG. 3, a tool screen 20 has a pallet area 21 and a work area 22. In the pallet area 21, a plurality of icons 23 corresponding to logical components forming the basis for designing are displayed. In the work area 22, a plurality of icons 24 placed (pasted) on the basis of the icons 23 arranged in the pallet area 21 are displayed. Furthermore, the icons 24 arranged in the work area 22 correspond to the respective software components constituting the application which is to be developed.

On such a tool screen 20, the user can carry out various operations (the pasting, movement and relating of icons, etc.) with respect to icons by means of an input unit, such as a mouse, and can design an application by combinations of logical components in connection with the operations with respect to these icons.

Specifically, for example, after the left button of the mouse is clicked on optional icons (icons A, B, C) of the plurality of icons 23 arranged in the pallet area 21, if the left button of the mouse is clicked again at an optional position in the work area 22, the icons 24 (icons A, B, C) can be placed on the work area 22 (see reference number 26). After the icons 24 are thus placed on the work area 22, if the right button of the mouse is clicked on the icons 24 to pop up a menu (not shown) to suitably select items in this menu, the attribute of logical components and so forth (names of logical components ("parent", "child1", etc.) and so forth) can be set.

If the left button of the mouse is pushed on the output terminal of an icon (icon A in FIG. 3), which corresponds to the original component for setting the relationship, of the icons arranged in the work area 22, and if the mouse is moved (dragged) to icons (icons B, C in FIG. 3) corresponding to components, the relationship between which is to be set, while pushing the left button, a relational line 25 between the icons can be defined (see reference number 27).

Furthermore, the operations with respect to the icons (the arrangement, movement and relating of icons, and so forth) on the tool screen 20 are realized by the basic operations of the mouse or the like. The basic operations of the mouse or the like are unified between logical components.

With such a construction, the operation of this preferred embodiment will be described below.

First, referring to FIGS. 4 and 5, the processing for the logical layer (the design tool 1) of the application development system shown in FIGS. 1 and 2 will be described below.

Figure 4:
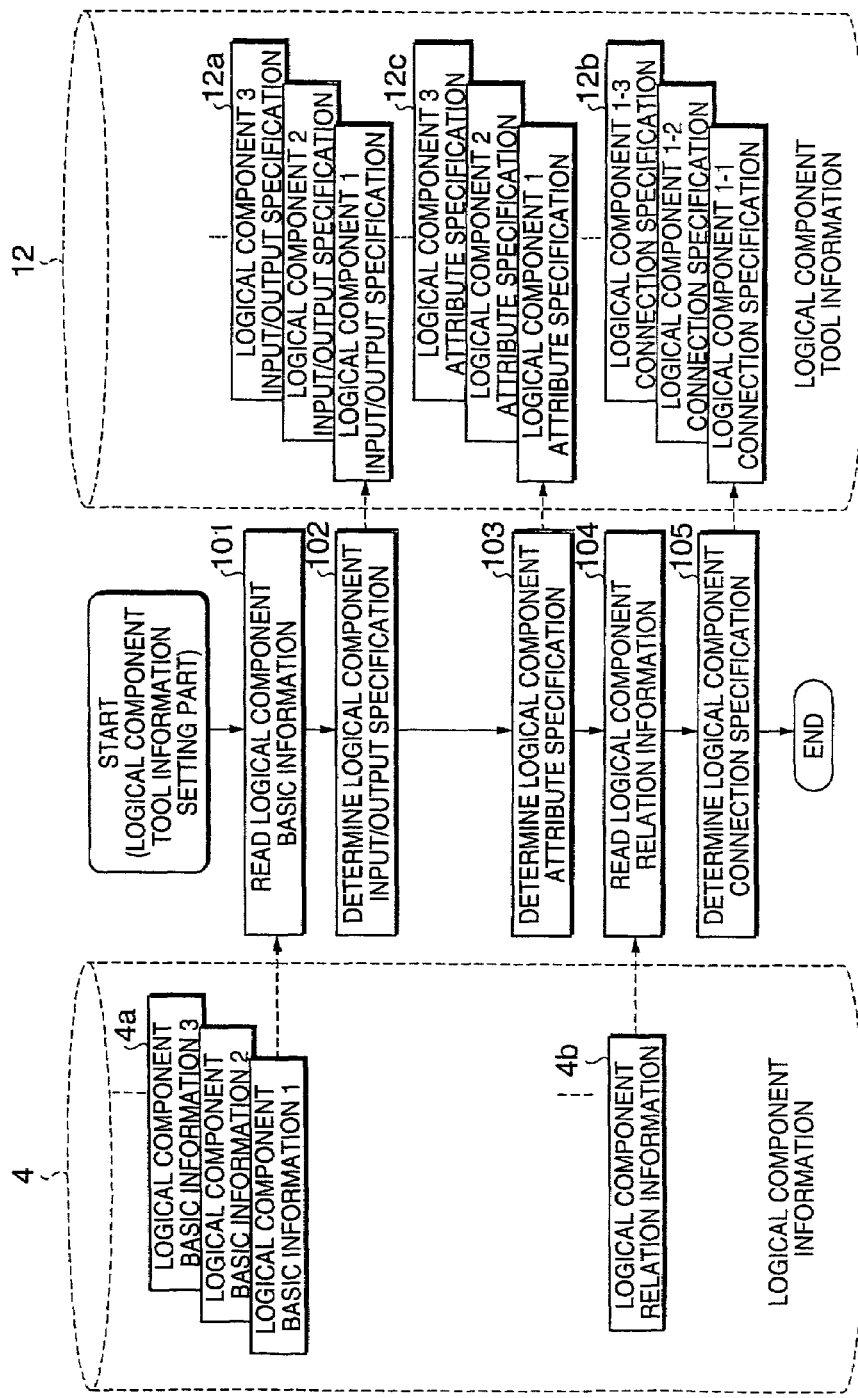
FIG. 4 is a flow chart for explaining the operation of a logical component tool information setting part of the design tool shown in FIGS. 1 and 2.

FIG. 4 is a flow chart for explaining the operation of the logical component tool information setting part 11 of the design tool 1 shown in FIGS. 1 and 2.

As shown in FIG. 4, the logical component tool information setting part 11 of the design tool 1 first reads the logical component basic information 4a of the logical component information 4 (step 101), and generates the logical component input/output specification 12a and logical component attribute specification 12c every logical component on the basis of the logical component basic information 4a (steps 102 and 103). Then, the logical component tool information setting part 11 reads the logical component relation information 4b of the logical component information 4 (step 104), and generates the logical component connection specification 12b every combination of logical components (step 105).

FIGS. 7A and 7B show an example of a logical component information 4. FIG. 7A shows the whole information including a part of the logical component basic information 4a (ID of each logical component) and the logical component relation information 4b (each connection information between logical components). FIG. 7B shows each information including a part of the logical component basic information 4a (the attribute information and input/output information of each logical component).

In the portion (A) of FIG. 7A, IDs of the respective logical components are described (<component type="A"/>, etc.). In the portion (B), the connection information between logical components forming the basis for the logical component connection specification 12b is described (<connection from="A" to ="B"/>, etc.). Furthermore, the portion of "<connection from="A" to="B"/>" expresses that it can be connected to the software component B from the software component A.

In the portion (C) of FIG. 7B, the attribute information of each logical component forming the basis for the logical component attribute specification 12c is described (<property name="name" type="string"/>, etc.). Furthermore, the portion of "<property name="name" type="string"/><property name="option" type="string"/>" expresses that there are two character string attributes of "name" and "option". In the portion (D), the input/output information of each logical component forming the basis for the logical component input/output specification 12a is described (<terminal id="out" type="out" min=1 max=3> . . . </terminal>, etc.). Furthermore, the portion of "<terminal id="out" type="out" min=1 max=3><connectwith type=B"/><connectwith type="C"/></terminal>" expresses that there is an output terminal "out" which allows one through three connections to the software component B or C.

Figure 5:
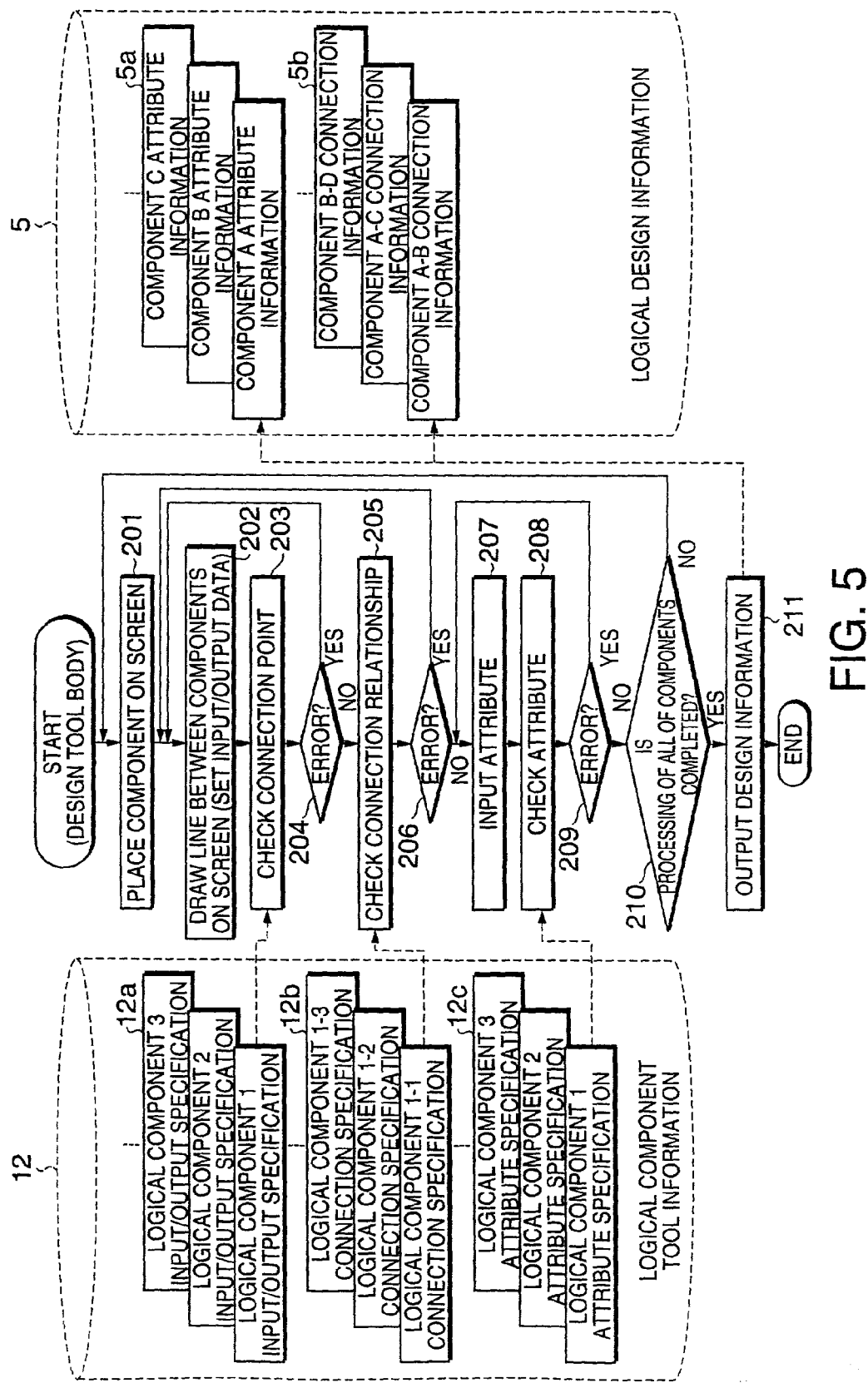
FIG. 5 is a flow chart for explaining the operation of a design tool body of the design tool shown in FIGS. 1 and 2.

FIG. 5 is a flow chart for explaining the operation of the design tool body 13 of the design tool 1 shown in FIGS. 1 and 2.

As shown in FIG. 5, the screen input/output interface part 14 of the design tool 1 presents the tool screen 20, which is shown in FIG. 3, under the control of the design tool body 13 to support the designing of an application, which is based on the combination of the respective logical components, by the user's operation of icons (steps 201 and 202).

Specifically, after the user clicks the left button of the mouse on optional icons (icons A, B, C) of the plurality of icons 23 arranged in the pallet area 21 of the tool screen 20, if the user clicks the left button of the mouse at an optional position in the work area 22 again, the screen input/output interface part 14 places the icons 24 (icons A, B, C) on the work area 22 (step 201).

In addition, if the left button of the mouse is pushed on the output terminal of an icon (icon A in FIG. 3), which corresponds to the original component for setting the relationship, of the icons arranged in the work area 22, and if the mouse is moved to icons (icons B, C in FIG. 3), corresponding to components, the relationship between which is to be set, while pushing the left button, the relational line 25 between the icons is defined (step 202).

Thereafter, the design tool body 13 checks the validity of the connection point of each logical component on the basis of the logical component input/output specification 12a of the logical component tool information 12 (step 203). If it is not valid, the routine returns to step 202 to continue the processing, and if it is valid, the routine goes to step 205 (step 204).

In addition, the design tool body 13 checks the validity of the respective connection relationships between logical components on the basis of the logical component connection specification 12b of the logical component tool information 12 (step 205). If it is not valid, the routine returns to step 202 to continue the processing, and if it is valid, the routine goes to step 207 (step 206).

Thereafter, if the user clicks the right button of the mouse on the icons 24, which are placed on the work area 22, to pop up a menu (not shown) to suitably select items in this menu to set the attribute of logical components and so forth (step 207), the design tool body 13 checks the validity of the attribute of each logical component on the basis of the logical component attribute specification 12c of the logical component tool information 12 (step 208). If it is not valid, the routine returns to step 207 to continue the processing, and if it is valid, the routine goes to step 210 (step 209).

Finally, it is determined whether the processing of all of the logical components is completed (step 210). If the processing is completed, the design tool body 13 outputs the logical design information 5 (step 211).

Figure 8:
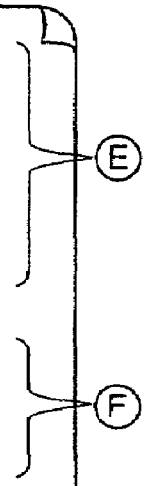
FIG. 8 shows an example of a logical design information which is outputted from the application development system shown in FIG. 1.

FIG. 8 shows an example of the logical design information 5. The logical design information 5 includes a component attribute information 5a (see (E)), and a component connection information 5b (see (F)). The logical design information 5 shown in FIG. 8 corresponds the combination of logical components shown in FIG. 3 (the combination wherein the icon B (name is "child1" and option is "11") is connected to the icon C (name is "child2" and option is "12") in the form of a tree below the icon A (name is "parent" and option is "1")).

Figure 6:
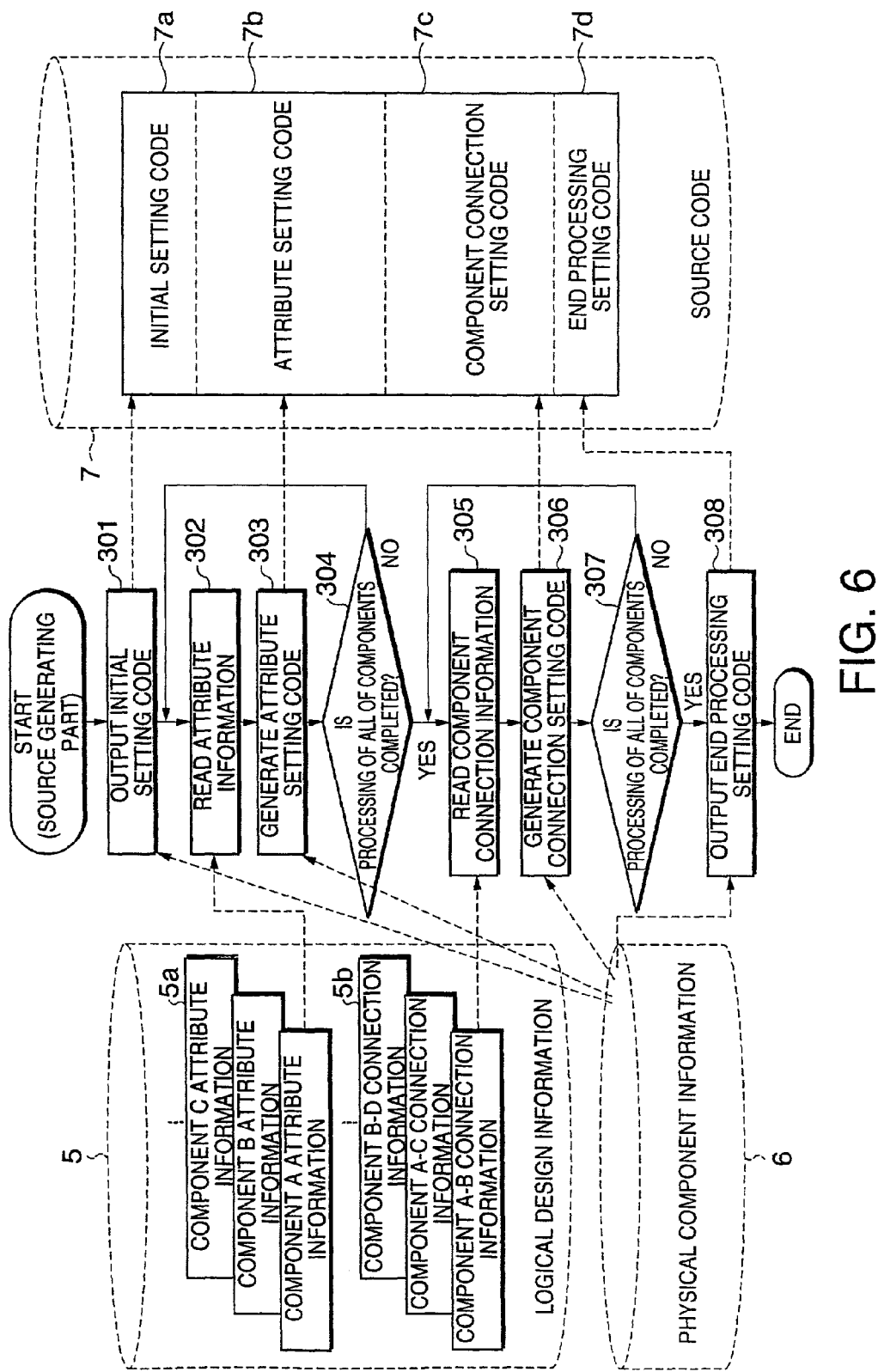
FIG. 6 is a flow chart for explaining the operation of a source generating part shown in FIG. 1.

Referring to FIG. 6, the processing of the physical layer (the source generating part 2 and the compiler 3) of the application development system shown in FIG. 1 will be described below.

FIG. 6 is a flow chart for explaining the operation of the source generating part 2 shown in FIG. 1.

As shown in FIG. 6, the source generating part 2 generates the source code 7 on the basis of the logical design information 5 (the component attribute information 5a and the component connection information 5b), which is outputted from the design tool 1, and the physical component information 6.

FIGS. 9, 10A, 10B and 10C show an example of the physical component information 6. FIG. 9 shows information, which is related to a code generating method for each software component, of the physical component information 6, and which includes a correspondence between physical components and logical components installed for a specific platform, the attribute related information and connection related information of each physical component, and so forth. FIGS. 10A, 10B and 10C show information related to the whole code generating method.

In the portion (G) of FIG. 9, an initializing code generating method for each software component is described (<new code="Class X%name%=ClassX.newinstance( )"/>, etc.). In addition, in the portion (H), an attribute setting code generating method for each software component is described (<property name="option" code="%name%.addItem ("OPTION", "%value%", "string")"/>, etc.). Moreover, in the portion (I), a component 25 connection setting code generating method for each software component is described (<code="%from".addItem ("CHILD", %to%);/>, etc.). It is noted that the portions of (G), (H) and (I) are portions forming the basis for the attribute setting code 7b and component connection setting code 7c of the source code 7, respectively. If the item "%xxx%" is replaced with the value of the logical design information 5, the corresponding portions of the source code 7 are generated.

In the portion (J) of FIG. 10A, an initial setting code generating method forming the basis for the initial setting code 7a of the source code 7 is described (<init file="fw1init.java"/>), and in the portion (K), an end processing setting code generating method forming the basis for the end processing setting code 7d of the source code 7 is described (<term file="fw1term.java"/>). It is noted that the portion of "<init file="fw1init.java"/>" is the description for importing a template file (fw1init.java) shown in FIG. 10B, and that the portion of "<term file="fw1term.java"/>" is the description for importing a template file (fw1term.java) shown in FIG. 10C.

As shown in FIG. 6, on the basis of such a physical component information 6, the source generating part 2 first outputs the initial setting code 7a of the source code 7 (step 301).

Then, the source generating part 2 reads the component attribute information 5a of the logical design information 5 (step 302), and generates the attribute setting code 7b of the source code 7 every software component on the basis of the component attribute information 5a and the physical component information 6 (step 303).

Thereafter, it is determined whether the processing of all of software components is completed (step 304). If the processing is not completed, the routine returns to step 302 to continue the processing, and if the processing is completed, the routine goes to step 305.

Then, the source generating part 2 reads the component connection information 5b of the logical design information 5 (step 305), and produces the component connecting setting code 7c of the source code 7 every software component on the basis of the component attribute information 5a and the physical component information 6 (step 306).

Thereafter, it is determined whether the processing of all of the software components is completed (step 307). If the processing is not completed, the routine returns to step 305 to continue the processing. If the processing is completed, the source generating part 2 outputs the end processing setting code 7d of the source code 7 on the basis of the physical component information 6 (step 308) to complete the whole processing. FIG. 11 shows an example of the source code 7 thus generated.

Incidentally, after the source code 7 is thus generated by the source generating part 2, as shown in FIG. 1, the source code 7 is processed by the compiler 3 to generate the executable file 9, which is executable on a specific platform, on the basis of the installation information of each physical component stored in the component library 8.

Thus, according to this preferred embodiment, the development of an application, which is based on the combination of software components, is divided into (1) the processing (logical layer) for designing an application by combining logical components provided by extracting portions, which do not depend on a system environment, such as a platform, from the software components, and (2) the processing (physical layer) for generating an application by combining physical components which are software components depending on the system environment. Therefore, the respective portions of the logical layer can be commonly utilized regardless of the final system environment, So that it is possible to develop an application corresponding to the system environment by separately preparing the respective part of the physical layer in accordance with the system environment. Therefore, it is possible to easily develop an application which is capable of flexibly coping with the variation in system environment and which has excellent maintainability.

Specifically, (1) on the basis of the logical design information 5 obtained by the processing of the logical layer (design tool 1), an application corresponding to a plurality of system environments can be generated by replacing the components and processing in the physical layer (the source generating part 2, the physical component information 6, the component library 8, the compiler 3 and so forth). In addition, (2) since the logical design information 5 obtained by the processing of the logical layer is not greatly influenced by the system environment, it is possible to easily generate an application, which is executable on a new system environment, by preparing the components and processing in a physical layer suitable for the new system environment, even if the system environment to be executed is greatly changed by technical progress or the like. Moreover, (3) since the processing in the logical layer can be limited to the output of a specific logical design information 5 regardless of the physical layer, it is possible to easily prepare a development tool which operates on a plurality of system environments.

In addition, according to this preferred embodiment, the logical design information 5 for connecting the processing in the logical layer to the processing in the physical layer is described by the XML language which is a general purpose language, so that flexibility can be given to both of the physical layer and the logical layer. Therefore, it is possible to replace the respective layers, and it is possible to extend the lifetime of the logical representation of the business processing of the application.

In the above described embodiment, the source generating part 2 is designed to generate a source code 7 including an attribute setting code and a component connection setting code; and the compiler 3 is designed to generate, on the basis of such a source code 7, an executable file 9 in which attributes and connections of software components has been set. However, like the following embodiment shown in FIGS. 12 to 17, it is possible to set such attributes and connections of software components when executing an executable file.

Referring now to FIGS. 12 to 17, another embodiment of an application development system according to the present invention will be described. The embodiment shown in FIGS. 12 to 17 is substantially the same in configuration as the embodiment shown in FIGS. 1 to 11 except that attributes and connections of software components are set when an executable file is executed. Therefore, in the embodiment shown in FIGS. 12 to 17, parts like or corresponding to those of the embodiment shown in FIGS. 1 to 11 are designated by the same reference numerals and the description thereof will be omitted.

Figure 12:
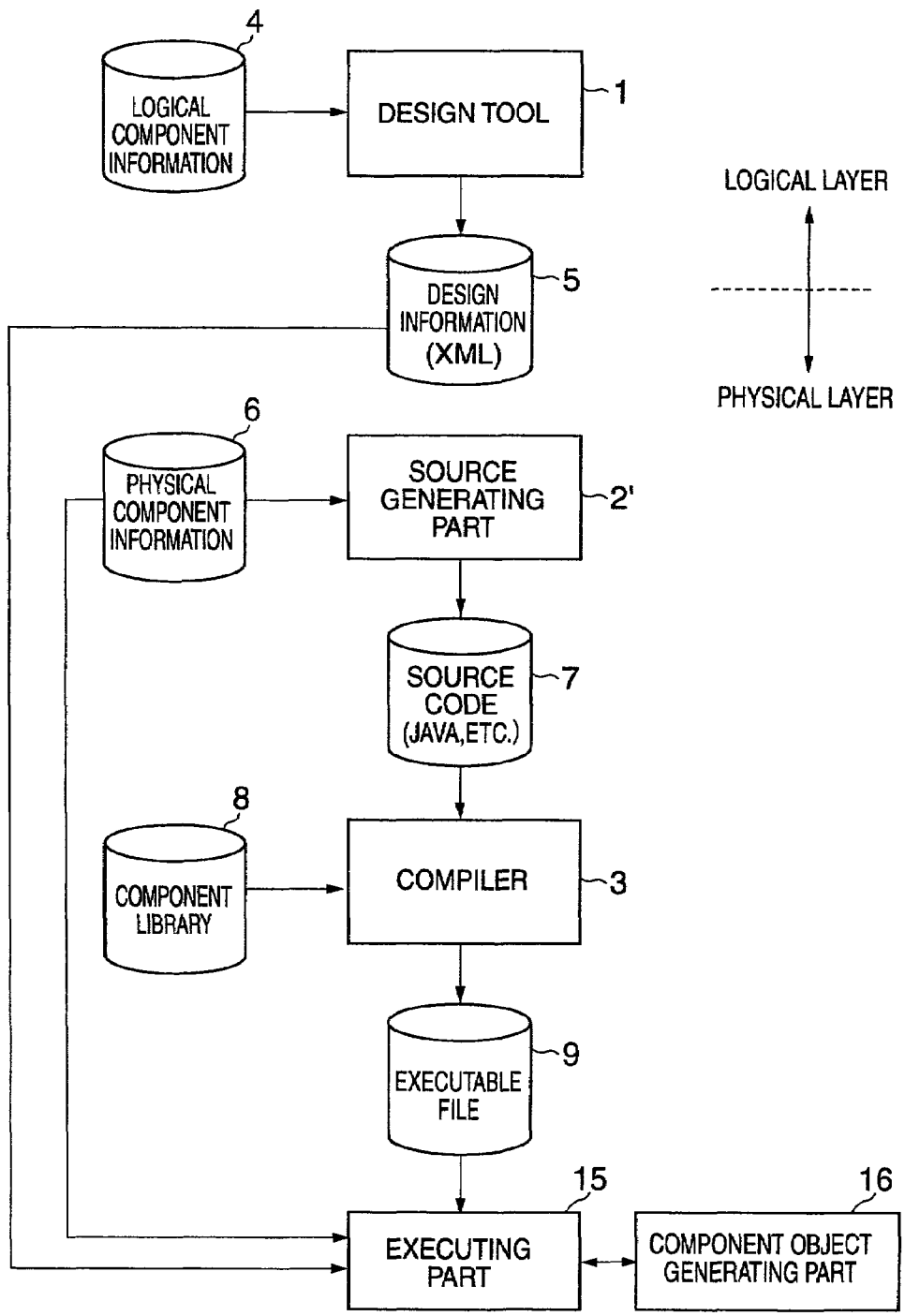
FIG. 12 is a block diagram of a system configuration showing another preferred embodiment of an application development system according to the present invention.

As shown in FIG. 12, in this embodiment, the source generating part 2' generates a source code 7 including an interpreter-type component object generating code; and an executing part 15 and a component object generating part 16 set attributes and connections of software components when an executable file 9, that is generated on the basis of such a source code 7 by the compiler 3, is executed.

Figure 13:
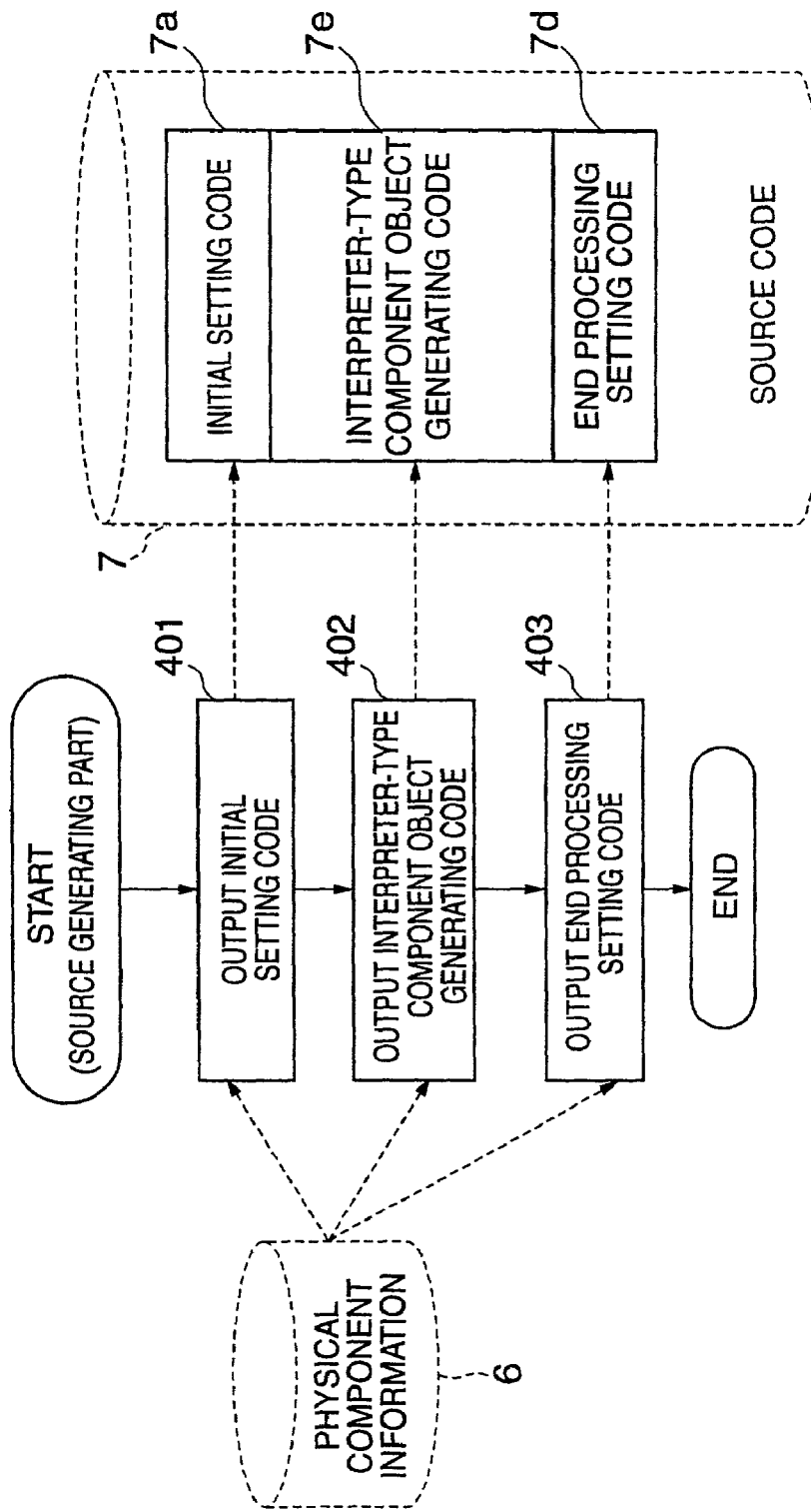
FIG. 13 is a flow chart for explaining the operation of a source generating part shown in FIG. 12.

FIG. 13 is a flow chart for explaining the operation of the source generating part 2' shown in FIG. 12.

As shown in FIG. 12, the source generating part 2 generates the source code 7 on the basis of the physical component information 6.

FIGS. 15, 16A, 16B, 16C and 16D show an example of the physical component information 6. FIG. 15 shows information, which is related to a component object generating method for each software component, of the physical component information 6. FIG. 16A, 16D, 16C and 16D show information related to the whole code generating method.

In the portion (L) of FIG. 16A, an initial setting code generating method forming the basis for the initial setting code 7a (see FIG. 13) of the source code 7 is described (<init file="fw1init.java"/>). Also, in the portion (M), a component object generating method forming the basis for the interpreter-type component object generating code 17e (see FIG. 13) of the source code 7 is described (<main file="fw1main.java"/>), and in the portion (N), an end processing setting code generating method forming the basis for the end processing setting code 7d (FIG. 13) of the source code 7 is described (<term file="fw1term.java"/>). It is noted that the portion of "<init file="fw1init.java"/>" is the description for importing a template file (fw1init.java) shown in FIG. 16B. It is also noted that the portion of "<main file="fw1main.java"/>" is the description for importing a template file (fw1main.java) shown in FIG. 16C, and that the portion of "<term file="fw1term.java"/>" is the description for importing a template file (fw1term.java) shown in FIG. 16D.

As shown in FIG. 13, on the basis of such a physical component information 6, the source generating part 2', first outputs the initial setting code 7a of the source code 7 (step 401).

Then, the source generating part 2' outputs an interpreter-type component object generating code 7e of the source code 7 (step 402).

Thereafter, the source generating part 2' outputs the end processing setting code 7d of the source code 7 on the basis of the physical component information 6 (step 403) to complete the whole processing. FIG. 17 shows an example of the source code 7 thus generated.

Incidentally, after the source code 7 is thus generated by the source generating part 2', as shown in FIG. 12, the source code 7 is processed by the compiler 3 to generate the executable file 9, which is executable on a specific platform, on the basis of the installation information of each physical component stored in the component library 8.

While the executable file 9 thus generated is executed by the executing part 15, the executing part 15 calls the component object generating part 16 during the processing so as to generate component objects of software components and to set attributes and connections of software components.

Figure 14:
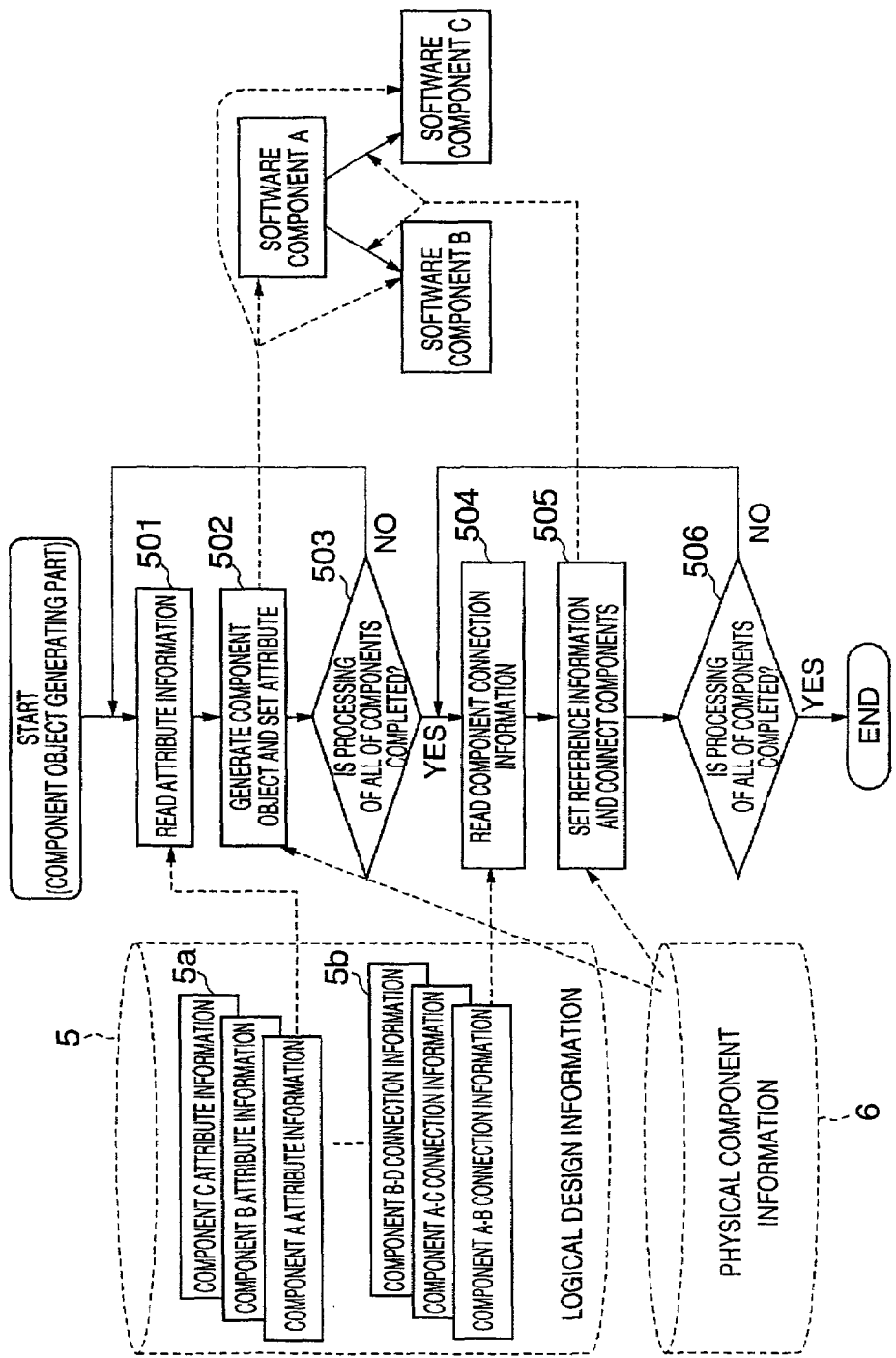
FIG. 14 is a flow chart for explaining the operation of a component object generating part shown in FIG. 12.

FIG. 14 is a flow chart for explaining the operation of the component object generating part 16 shown in FIG. 12.

As shown in FIG. 14, the component object generating part 16 generates component objects and sets attributes and connections of software components, on the basis of the logical design information 5 (the component attribute information 5a and the component connection information 5b), which is outputted from the design tool 1, and the physical component information 6.

Specifically, the component object generating part 16 reads the component attribute information 5a of the logical design information 5 (step 501), and generates a component object every software component on the basis of the component attribute information 5a and the physical component information 6, and sets attributes for the components (step 502).

Thereafter, it is determined whether the processing of all of software components is completed (step 503). If the processing is not completed, the routine returns to step 501 to continue the processing, and if the processing is completed, the routine goes to step 504.

Then, the component object generating part 16 reads the component connection information 5b of the logical design information 5 (step 504), and sets a reference information every software component on the basis of the component attribute information 5a and the physical component information 6, and connects the components to each other (step 505).

Thereafter, it is determined whether the processing of all of the software components is completed (step 506). If the processing is not completed, the routine returns to step 504 to continue the processing. If the processing is completed, the whole processing is completed.

Figure 18:
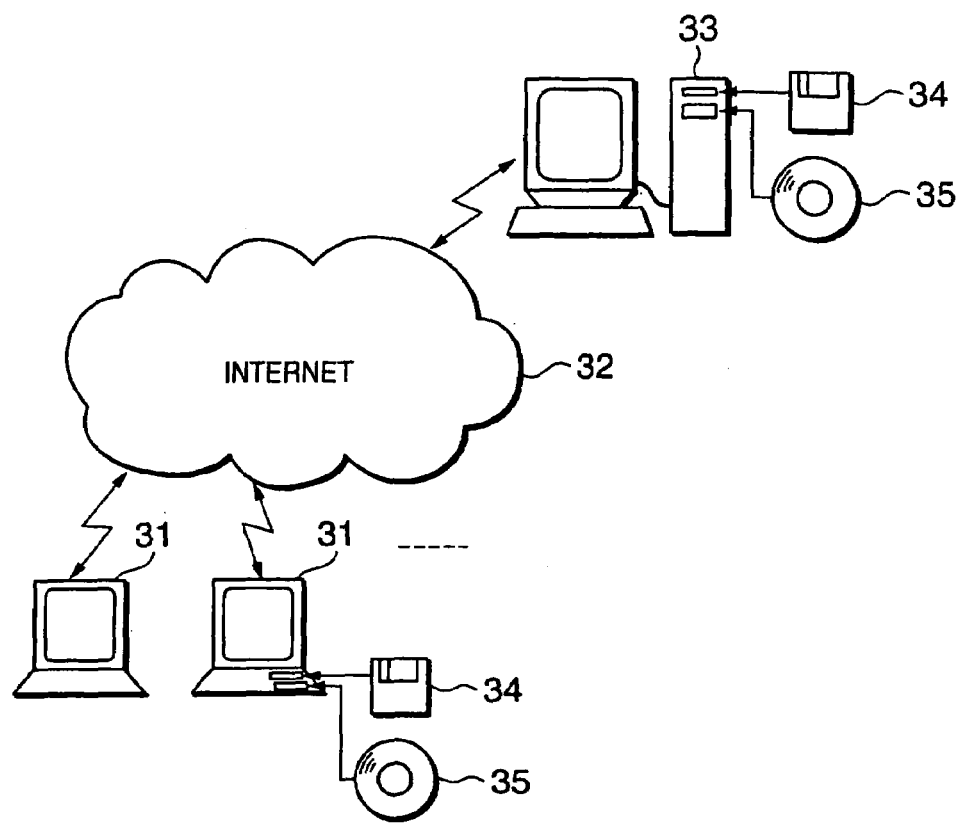
FIG. 18 is a diagram showing an example of a distributed development environment to which an application development system according to the present invention is applied.
Figure 19:
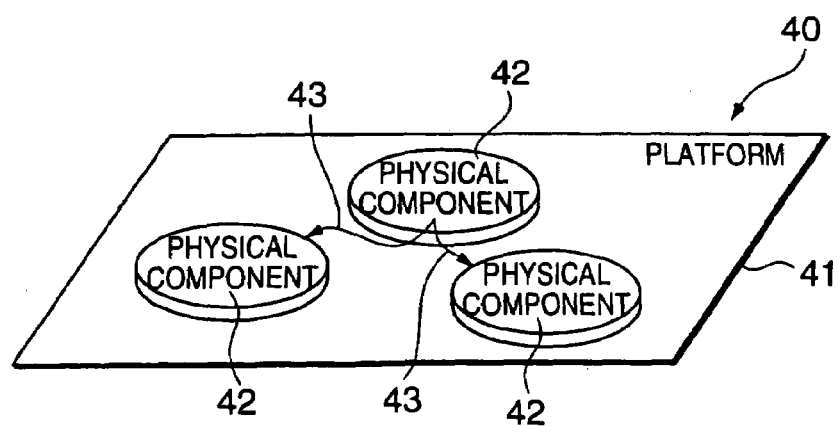
FIG. 19 is a schematic diagram for explaining a conventional application development method.
Figure 20:
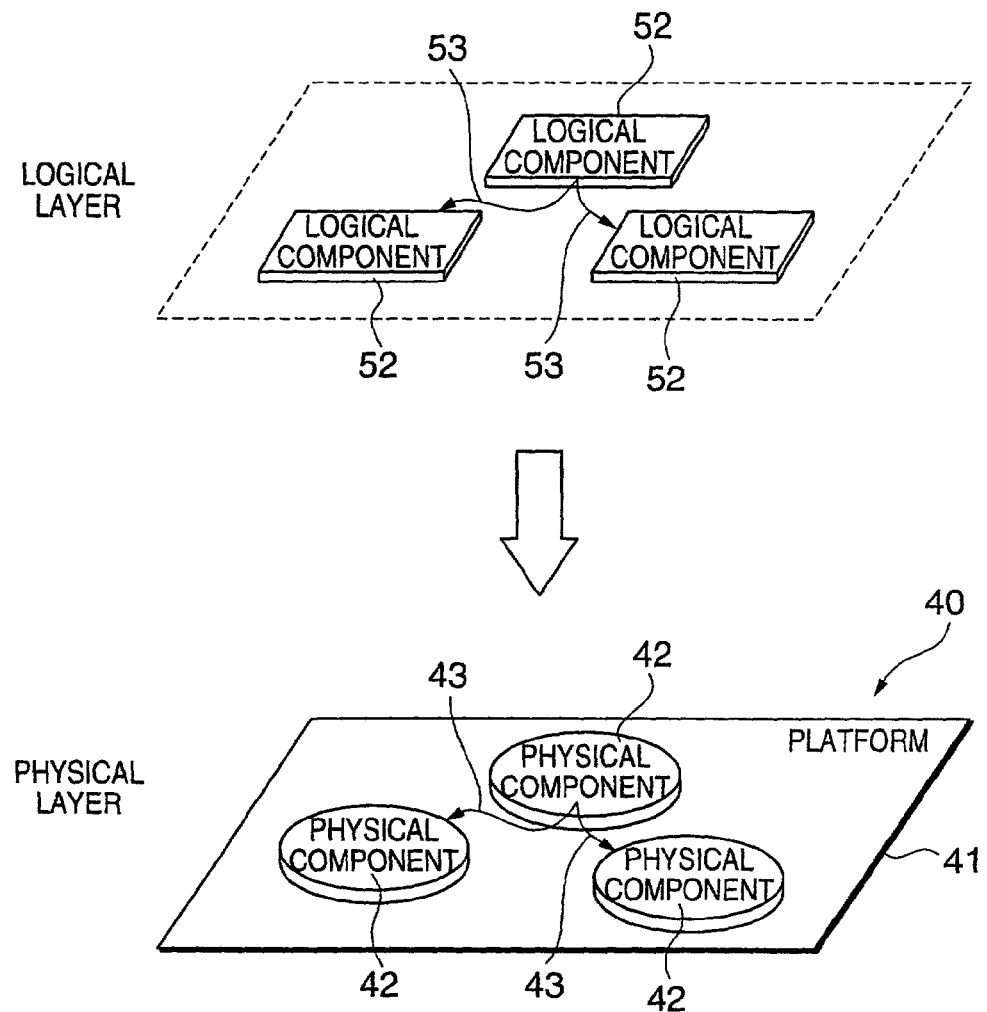
FIG. 20 is a schematic diagram for explaining an application development method according to the present invention.

While the application development system has been realized on a single computer in the above described embodiments as shown in FIGS. 1 to 11 and FIGS. 12 to 17, the present invention should not be limited thereto, but it is possible to realize an application development system in a distributed development environment shown in FIG. 18. Specifically, as shown in FIG. 18, in a plurality of client computers 31 and a server computer 33 which are connected to each other via a network, such as Internet, the logical layer (the design tool 1 and the logical component information 4) may be provided on the client computers 31, and the physical layer (the source generating part 2, the compiler 3, the physical component information 6, the source code 7, the component library 8 and the executable file 9) may be provided on the server computer 33. In this case, it is possible to suppress the traffic since the logical design information 5 based on the XML language or the like, which does not include the installation information on physical components, is delivered between the client computers 31 and the server computer 33. Therefore, the application on the side of the server computer 33 can be developed from the side of the client computers 31 even in Internet environment, so that the present invention can be applied to a service which provides an open application development environment in Internet environment.

In addition, while the source code 7 generated by the source generating part 2 is integrated with the component library 8 by means of the compiler 8 in the above described embodiments as shown in FIGS. 1 to 11 and FIGS. 12 to 17, the present invention should not be limited thereto, but the source code 7 may be integrated with the component library 8 by a component selecting technique or a component plug-in technique.

Moreover, while the logical component information 4 and the physical component information 6 have been described by the XNL language in the above described embodiments as shown in FIGS. 1 to 11 and FIGS. 12 to 17, the present invention should not be limited thereto, but the logical component information 4 and the physical component information 6 may be described by an optional format, such as a tabular format.

Furthermore, in the above described embodiments as shown in FIGS. 1 to 11 and FIGS. 12 to 17, the design tool 1, source generating part 2 and compiler 3 of the application development system can be realized as a program. Such an application development program can be recorded in a computer-readable recording medium, such as a flexible disk 34 or a CD-ROM 35, if the environment is, e.g., a distributed development environment shown in FIG. 18. Thus, on the client computers 31 and the server computer 33, it is possible to develop the application in accordance with the procedure shown in FIGS 4 to 6 and FIGS. 13 and 14.

The recording media according to the present invention should not be limited to flexible disks and CD-ROMs. The recording media may be any recording media, which are capable of recording programs and which are capable of being read by computers, such as magnetic disks, internal memories, optical disks (CD-R, DVD (Digital Versatile Disk), etc.), optical magnetic disks (MO (Magneto Optical), etc.) and semiconductor memories, and their recording types may be any types. In addition, the recording media include carrier waves, which are transmitted on a network, and information transmitting media.

A part of each processing for realizing this preferred embodiment may be executed by an operating system (OS) which operates on a computer on the basis of the instruction of a program installed in the computer from a recording medium, or a middle ware (MW), such as a data base management software or a network software.

The recording media according to the present invention should not be limited to media independent of computers, and includes a medium in which a program transmitted by LAN or Internet has been downloaded to be stored or temporarily stored.

The number of the recording media according to the present invention should not be limited to one. The processing in this preferred embodiment may be executed by a plurality of media, and the construction of the media may be any construction.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as sat forth in the appended claims.

What is claimed is:

1. An application development system of hardware and software for combining a plurality of software components to develop an application, said system comprising:
   a logical design part that supports a designing of an application, that is based on the combination of a plurality of logical components, on the basis of a logical component information including a definition information for the logical components, to output a logical design information obtained by the designing of the application, said logical components being provided by said logical design part by extracting a portion, that does not depend on a system environment, from said software components so as to correspond to a plurality of software components, respectively; and
   a physical installation part that generates an application, that is executable on the system environment, on the basis of said logical design information, that is outputted from said logical design part, and a physical installation information for said software components, the physical installation information including a physical component information having a correspondence between physical components and the logical components.

2. An application development system as set forth in claim 1, wherein said logical design part includes:
   a specification information generating part that generates a specification information for each of said logical components on the basis of said logical component information; and
   a design part body that supports the designing of the application, that is based on the combination of said logical components, on the basis of said specification information for each of said logical components, that is generated from said specification information generating part.

3. An application development system as set forth in claim 2, wherein said specification information for each of said logical components includes an input/output specification for each of said logical components, a connection specification between said logical components, and an attribute specification for each of said logical components.

4. An application development system as set forth in claim 1, wherein said physical installation part includes:
   a source generating part that generates a source code on the basis of said logical design information, that is outputted from said logical design part, and a physical component information including a correspondence between physical components and logical components that are installed for the system environment; and an executable file generating part that generates an executable file, that is executable on the system environment, on the basis of said source code, that is generated by said source generating part, and a component library in which an installation information for each of said physical components is stored.

5. An application development system as set forth in claim 1, wherein said physical installation part includes:

a source generating part that generates a source code on the basis of a physical component information including a correspondence between physical components and logical components that are installed for the system environment;

an executable file generating part that generates an executable file, that is executable on the system environment, on the basis of said source code, that is generated by said source generating part, and a component library in which an installation information for each of said physical components is stored; and a component object generating part that generates component objects, when executing said executable file, on the basis of said logical design information and said physical component information, so as to set attributes and connections of components.

6. An application development system as set forth in claim 1, wherein said logical design information includes an attribute information for each of said logical components, and a connection information between said logical components.

7. An application development system as set forth in claim 1, wherein said logical design information is described by an extensible markup language.

8. An application development system as set forth in claim 1, wherein said logical design part and said physical installation part are provided on each of a client computer and a server computer that are connected to each other via a network, and said logical design information is delivered between said client computer and said server computer.

9. An application development method for combining a plurality of software components to develop an application, said method comprising the steps of:

supporting a designing of an application, that is based on the combination of a plurality of logical components, on the basis of a logical component information including a definition information for the logical components, said logical components being provided so as to correspond to a plurality of software components, respectively, and said logical components being provided by extracting a portion, that does not depend on a system environment, from said software components; and generating an application, that is executable on the system environment, on the basis of said logical design information, that is obtained by said designing, and a physical installation information for said software components, the physical installation information including a physical component information having a correspondence between physical components and the logical components.

10. A computer-readable recording medium having stored an application development program for combining a plurality of software components to develop an application, said program for causing a computer to execute the procedures of:

reading a logical design information obtained by combining logical components that are provided so as to correspond to a plurality of software components, respectively, and that are provided by extracting a portion, that does not depend on a system environment, from said software components; and generating an application, that is executable on the system environment, on the basis of the logical design information read by the above step and a physical installation information for said software components, the physical installation information including a physical component information having a correspondence between physical components and the logical components.

11. A computer readable recording medium storing computer program instructions which when executed by a computer programmed with the instructions, causes the computer to perform the following steps:

presenting a specific information for logical components, that are provided so as to correspond to a plurality of software components, to enable a user to select one of said logical components;

receiving the logical component selected by the user;

generating a logical design information on the basis of a logical component information with respect to the received logical component, said logical component information including a definition information for the selected logical component; and generating an application on the basis of said logical design information and a physical installation information for said software components, the physical installation information including a physical component information having a correspondence between physical components and the logical components.

* * * * *